No. 758,094. PATENTED APR. 26, 1904.
T. W. NEELY.
ELECTRIC STEAM AND VAPOR GENERATOR.
APPLICATION FILED APR. 23, 1901.
NO MODEL.
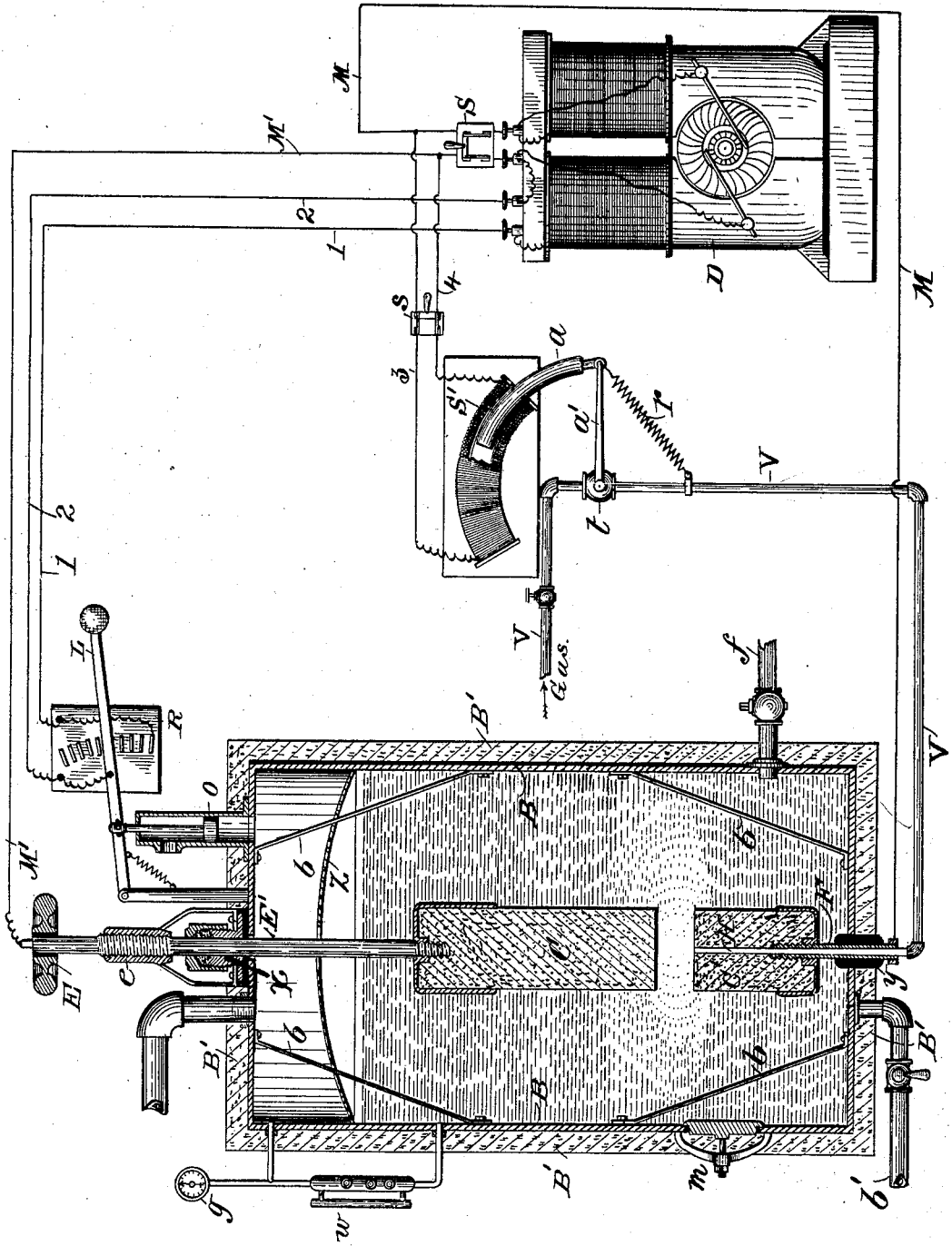
WITNESSES:
W. R. Edelen.
Edw. W. Byrn.
INVENTOR
Thomas W. Neely.
BY Munn & Co.
ATTORNEYS No. 758,094.

Patented April 26, 1904.

UNITED STATES PATENT OFFICE.

THOMAS W. NEELY, OF MARSHALL, ILLINOIS.

ELECTRIC STEAM AND VAPOR GENERATOR.

SPECIFICATION forming part of Letters Patent No. 758,094, dated April 26, 1904.

Application filed April 23, 1901. Serial No. 57,131. (No model.)

*To all whom it may concern:*

Be it known that I, THOMAS W. NEELY, of Marshall, in the county of Clark and State of Illinois, have invented a new and useful Improvement in Electric Steam and Vapor Generators, of which the following is a specification.

My invention is in the nature of a novel form of steam-generator in which the heat for converting the water into steam is supplied internally in relation to the shell of the boiler by an electric arc or two electrodes juxtaposed in the relation of an electric arc and immersed in the water.

It also comprehends means for introducing at one of the electrodes hydrocarbon vapor or other combustible gases adapted to unite with the oxygen which may be set free by electrolysis of the water and be burned and by the intense heat of the electric arc or hydrocarbon flame to form an auxiliary or supplementary source of heat and pressure within the boiler.

My invention consists in various features of novelty hereinafter described with reference to the drawing, in which—

The figure is a vertical section of the boiler and a side elevation of the dynamo or electric generator with automatic regulating devices and showing also means for introducing the combustible vapor or gas.

In the drawing, B is a boiler-shell inclosed on all sides, top, and bottom by a heat-insulating covering B'. The boiler is equipped with the usual feed-water pipe $f$, manhole $m$, blow-off pipe $b'$, water-level glass $w$, steam-gage $g$ and has within it braces or stay-rods $b$ to enable it to stand a great pressure without bulging at the ends.

D is a dynamo or electric generator whose main conducting-wires M M' lead, respectively, the one to the bottom and the other to the top of the boiler. The wire M' connects with an adjustable carbon electrode C, suspended within the boiler from the top, and the wire M connects with the lower carbon C'. The upper carbon is sustained upon an adjustable rod E', which passes through an insulated stuffing-box $x$ in the top of the boiler and is raised and lowered by a screw-thread meshing with a stationary nut $e$ and an insulated hand-wheel E. The lower carbon C' is held upon a hollow rod F, which passes through an insulated bushing $y$ in the bottom of the boiler. The rods E' and F are connected to the carbons or to carbon-sockets by screw-joints. The lower carbon C' has a central hole H through it, which is in open communication with the base of the hollow rod F and an external pipe V, which leads to a source of combustible vapor hereinafter described. When the electric current from the dynamo is taken through the wires M M' to the two carbons and the latter are separated, an electric arc will be established between them even though immersed in the water, and the intense heat will rapidly generate steam and without loss of heat and will under certain conditions also effect the partial decomposition of the water into the constituent gases, oxygen and hydrogen. I take advantage of this to combine in the boiler the nascent oxygen with combustible vapors introduced through the pipe V and the opening in the lower carbon, so as to get a further increase of heat and pressure. The pipe V leads to a carbureter or source of combustible vapors and has a valve $t$ in its length controlled by an arm $a'$, which is normally held at right angles to the pipe by a spring $r$. The end of the arm $a'$ is connected to a curved armature-core $a$, that slides in and out the central chamber of a curved helix S', forming a solenoid. The terminals of the helix S' connect with wires 3 4, and these, through switch $s$, form a shunt-circuit from the wires M M'. When the shunt-circuit is established through switch $s$ and wires 3 4, the solenoid-armature $a$ pulls up arm $a'$ and opening valve $t$ allows combustible gas to pass through pipes V to the end of the lower electrode, to be there burned. When the dynamo-current is cut off from the boiler by the main switch S or by other means, either accidental or otherwise, then spring $r$ pulls the arm $a'$ to its right-angular position, as shown, and closes valve $t$, cutting off the supply of combustible gas, thus guarding against an oversupply of gas to the boiler and consequent explosion.

To automatically regulate the steam-pressure, a safety-valve O has its weighted lever L organized as a switch and bears a rubbing contact that passes over the graduated faceplates of a rheostat R. This rheostat by wires 1 2 is in the field-circuit of the dynamo, and when an excessive pressure in the boiler lifts the safety-valve lever its rubbing contact cuts in a larger resistance of the rheostat and by reducing the energy of the field-magnets of the dynamo reduces the activity of steam-generation and electrolysis.

Z is a perforated and arched diaphragm placed over the space occupied by the water to prevent the frothing or heaving of the water in case of rapid evaporation, which would make it difficult to determine the water-level.

In this generator the heat is applied to the water or other expansive element direct without the intervention of iron or other material of a less conductivity or convectivity of heat than the water or other expansive element itself. In all other types of boilers or generators the heat is really insulated from the water by the relatively poor conductivity of the iron. In other words, the makers of other types of boilers or generators apply their heat on the outside, endeavoring to transmit it to the water within, and then try to retain the heat in the boiler. In this boiler or generator the heat is applied within the boiler and is easily retained, as there are no doors to be continually opened or fronts or stacks or walls to radiate or conduct the heat from it as in ordinary type of boilers. In my generator advantage is taken of the intense heat of the electric arc and hydrocarbon flame or other forms of intensified heat, and the construction and operation are such as to permit of the almost complete insulation of the heat of the boiler and its contents from the surrounding atmosphere or from other bodies, thus delivering approximately all the energy in the fuel used to the engine or other appliance in the form of dry steam or other vapor. Furthermore, the heat being applied or generated internally permits of the use of boiler-plate of any desired thickness or strength without interfering with the transmission of heat or impairing the efficiency of the boiler, thus rendering it possible to use higher-pressure apparatus than heretofore. In my generator there is no need of flues or tubes, on account of the water being of higher heat conductivity or convectivity than iron and the heat all being retained in the generator except as it passes away to the engine by means of the steam or other expansive element. Thus the generator is rendered much more simple than existing types and allowing freer access to all its internal parts.

Operation: On boiler or generator being started for the first time or after being opened for any cause water should be pumped into it until it reaches the water-line shown in the drawing, or nearly so. The electric current is then turned into the boiler, forming a circuit through upper and lower carbons, which should at the time be in contact with each other. Upon raising the upper or positive carbon by means of the adjusting-wheel the arc is established in the water between the carbons. The switch in the circuit leading to the solenoid may then be adjusted to throw it in circuit, whereupon the armature will be drawn up into the solenoid, thus opening the vapor-pipe which supplies the vapor from the carbureter or compressor or other source of combustible vapor to the arc through the lower carbon. The water coming in contact with the arc (and by electrolysis) is separated into its elements, the hydrogen being set free and the oxygen forming compounds with the carbon in the hydrocarbon vapor and with the carbon of the pencils between which the arc is formed, thus generating great heat. When the temperature and pressure rise until the desired pressure is reached, the piston in safety-valve begins to rise, thus raising regulating-arm and cutting in resistance into the fields of the dynamo as the pressure reaches the point for which it is adjusted and does the reverse as the pressure begins to lower. Where the boiler or generator is used regularly every twenty-four or forty-eight hours, there is no need to wait to raise steam, as owing to the high insulation of heat which may be secured one may shut down for a period of from twenty-four to thirty-six hours with but a small loss in pressure or temperature and the heat being applied to the water as soon as you start to draw on the reserve force of the boiler the normal condition is soon reëstablished. In places where no power can be obtained from another source a storage battery or small auxiliary boiler should be installed to be used to supply current when starting boiler anew or after having been opened for any cause.

That this generator can be used as readily in domestic heating of houses and in heating other buildings and places of business is self-evident, as, owing to the great saving of fuel in this device over others used at present, such places could be provided with generators of this type and the necessary current supplied as is the current for illuminating purposes to-day.

I do not claim in this case the process of generating steam or pressure vapors, as this is made the subject-matter of a separate application for a patent, filed May 2, 1901, Serial No. 58,505.

I am aware that it is not broadly new to generate steam within a closed shell by two terminal plates immersed in the water and connected with a source of electric current; but there was no arc, no alined electrodes, no adjustment of the electrodes toward each other, and no extraneous supply of gas for admixture and recomposition with the disassociated gases of the water. I am also aware that an electric arc has been employed in metallurgical operations and do not claim either of these processes or instrumentalities broadly.

Having thus described my invention, what I claim as new, and desire to secure by Letters Patent, is—

1. A steam-generator comprising a tightly-closed steam-resisting retaining-shell for the water and steam, two alined electrodes for the production of an electric arc both immersed in the water, and means for adjusting them toward each other substantially as and for the purpose described.

2. A steam-generator comprising a tightly-closed steam-resisting retaining-shell surrounded on all its external surfaces, including the bottom, with a heat-insulating material and containing within it two alined electrodes for the production of an arc, both immersed in the water, and means for adjusting one toward the other substantially as and for the purpose described.

3. A combined steam and vapor generator comprising a tightly-closed shell having two alined electrodes within for the production of an arc within a body of water, and to effect the decomposition of the water by electrolysis, means for supplying a combustible vapor or gas to said arc for admixture with the gases of the decomposed water and the burning of these added gases with production of heat and pressure substantially as described.

4. A combined steam and vapor generator comprising an inclosing shell having two alined electrodes within for the production of an arc, said electrodes being both immersed in the water, a dynamo, a supply-pipe for combustible vapor or gas extending through one of the electrodes, a regulating-valve for said supply-pipe having swinging arm, and spring, a curved solenoid-armature attached directly to said swinging arm and a curved helix for said armature placed in a shunt-circuit of the dynamo substantially as and for the purpose described.

THOMAS W. NEELY.

Witnesses:
 CHAS. F. WYSONG,
 HARRY M. JANNEY.